United States Patent [19]

Calligarich

[11] Patent Number: 4,758,297
[45] Date of Patent: Jul. 19, 1988

[54] HOT PIN LAMINATED FABRIC

[75] Inventor: Elio Calligarich, Milan, Italy

[73] Assignee: FMC Corporation, Chicago, Ill.

[21] Appl. No.: 870,209

[22] Filed: Jun. 3, 1986

[51] Int. Cl.⁴ .................. B32B 31/08; B32B 31/18; B32B 31/26

[52] U.S. Cl. .................. 156/251; 156/148; 156/252; 156/290; 156/308.4; 156/309.6; 156/513; 156/515; 428/137; 428/314.2

[58] Field of Search ............ 156/251, 252, 290, 309.6, 156/515, 513, 148, 73.3, 499, 253, 308.4, 309.9, 82, 88; 428/131, 137, 314.2; 425/290, 291, DIG. 37

[56] References Cited

U.S. PATENT DOCUMENTS

| | | | |
|---|---|---|---|
| 2,244,550 | 6/1941 | Chandler | 156/515 |
| 2,545,243 | 3/1951 | Rumsey | 156/253 |
| 3,073,304 | 1/1963 | Schaar | 156/252 |
| 3,115,564 | 12/1963 | Stacy | 156/252 |
| 3,403,681 | 10/1968 | Hoey et al. | 156/253 |
| 3,719,736 | 3/1973 | Woodruff | 156/252 |
| 4,044,180 | 8/1977 | Baker | 428/35 |
| 4,128,679 | 12/1979 | Pohland | 156/513 |
| 4,432,822 | 2/1984 | Adams et al. | 156/252 |
| 4,657,610 | 4/1987 | Komatsu et al. | 156/87 |

FOREIGN PATENT DOCUMENTS

| | | |
|---|---|---|
| 0943163 | 5/1956 | Fed. Rep. of Germany . |
| 1482890 | 8/1977 | United Kingdom . |

Primary Examiner—Jerome Massie, IV
Attorney, Agent, or Firm—Douglas W. Rudy; Richard B. Megley

[57] ABSTRACT

A multi-ply fabric is assembled from a plurality of plies including at least a single thermoreactive ply and a single fibrous ply. The method of combining the plies incorporates a hot pin perforator to simultaneously perforate and bond the thermoreactive ply to the fibrous ply.

The multi-ply material finds utility in absorptive products having a liquid impervious perforated surface acting as a facing or covering for the absorptive inner plies.

3 Claims, 1 Drawing Sheet

U.S. Patent   Jul. 19, 1988   4,758,297
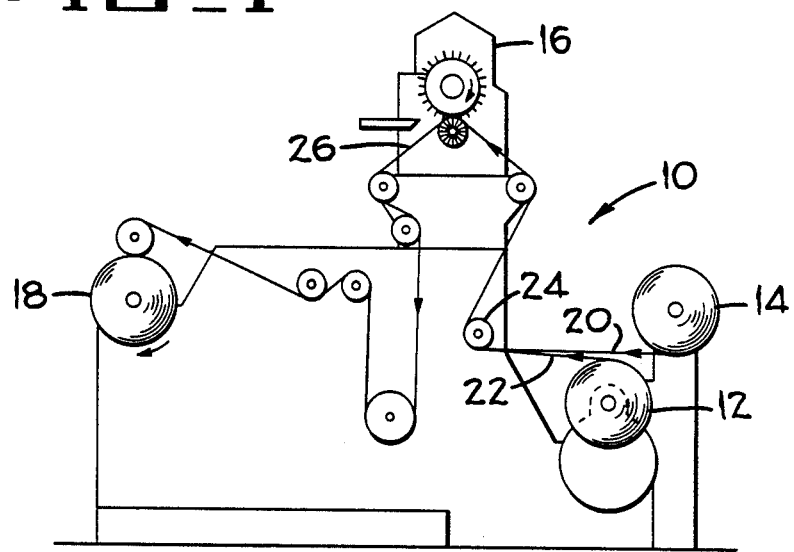
FIG_1
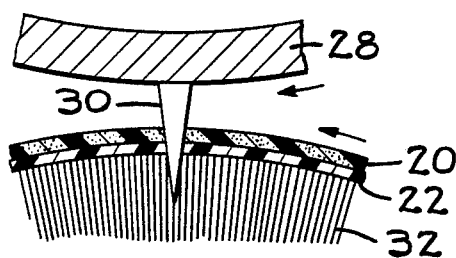
FIG_2
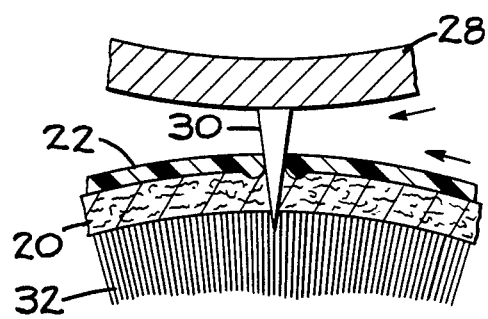
FIG_4
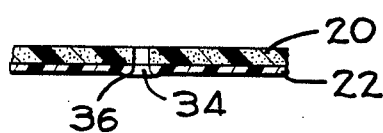
FIG_3
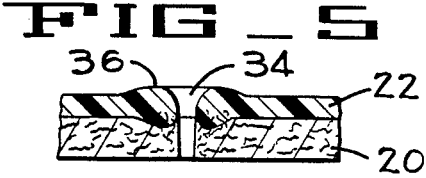
FIG_5
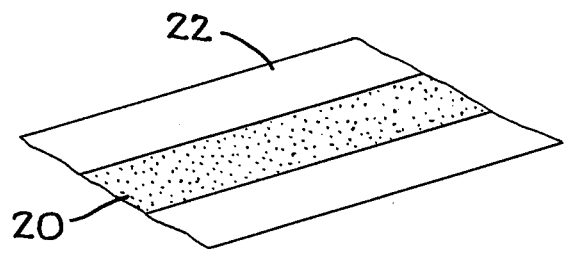
FIG_6

HOT PIN LAMINATED FABRIC

BACKGROUND OF THE INVENTION

1. Field of the Invention

The invention has to do with the method of manufacturing, and the product of the method of manufacturing, a multi-ply composite woven or non-woven laminated material having at least one ply of thermoreactive film and at least a second ply of fibrous or cellular material. Heated perforation pins are carried by a rotating cylinder which will contact a composite multi-ply assembly of film and fibrous or cellular material as the laminate is fed to the bite of a hot pin rotating cylinder and a pressure control roller. The film and fabric to be perforated and bonded together is forced against the pins by a pressure means such as a deformable pressure control roller. The heated pins cause perforations in the film and partially melt the film into adhesive contact with the fibers of the fabric or the cellular structure such that a bond is formed therebetween.

2. Description of the Prior Art

Heated pin perforators have been provided wherein the pins are heated from a heat source inside the pin hosting rotating cylinder and wherein the pins are heated from a heat source on the exterior of the pin hosting rotating cylinder as well as a combination of both.

Perforation of plastic film materials is very desirable for many applications where a wrapping having permeability is desirable. Typical applications include the wrapping of food articles such as vegetables where conventional wrapping products prevent the free flow of air to the product thereby causing the product to spoil. Perforated films also find applications as filtering medium. The applicant herein has developed a heretofore unknown multiple ply material utilizing the expediant manufacturing technique utilizing the hot pin perforator. In this new method of laminating a ply of thermo deformable film to a ply of cellular or fibrous fabric a multi-ply material for use in the manufacture of fluid absorbing material can be realized.

DRAWING FIGURES

In the drawings there are several figures which show various aspects of the hot pin perforator and the method of producing a multi-ply perforated an laminated product. Perusal of these drawings in conjunction with the following description will make this invention readily understandable. The drawing figures are:

FIG. 1 is a schematic presentation of an end view of a hot pin perforator showing the path followed by material being processed and complete with a dual letoff and a rewinder section.

FIG. 2 is a partially sectioned cross section view of a cellular ply being pierced by a hot pin.

FIG. 3 is a cross section of an assembled cellular ply and plastic ply.

FIG. 4 is a partially sectioned view of a pin penetrating film and fibrous fabric layers of a two ply laminate as the fabric moves across a pressure control roller.

FIG. 5 is a section view showing film deformation around a pierced aperture and the fibers fused to the film.

FIG. 6 is a representation of a two ply laminated material.

DETAILED DESCRIPTION OF THE INVENTION

The following specification sets forth a method of manufacturing a laminated multi-ply material that has the desirable combination of a non-absorbant surface and a highly absorbant surface, and the product itself. The specification simply sets forth a preferred embodiment that will allow those skilled in the art to adapt the material to other uses than those mentioned above.

The schematic FIG. 1 presents a hot pin perforator generally 10 having a fabric letoff station 14 and a plastic film letoff station 12, a perforator head unit 16 and a windup section generally 18. A first ply of fibrous or cellular material, either woven or non-woven, open celled or closed cell but preferably non-woven or open celled, hereinafter referred to as "fabric" 20, is letoff from the fabric letoff station 14 and threaded through a plurality of alignment rollers such as 24. A second ply of material 22, a thermo deformable material such as polyester or polypropylene film, is letoff from the second letoff station 12.

The two plies of materials, the film 22 and the fabric 20, are threaded through the hot pin perforator head 16 where the two materials are bonded together to form a laminate of multi-ply material 26 which is ultimately rolled up in a conventional manner at the windup 18.

FIG. 2 shows a portion of the hot pin perforator 28 having a representative hot pin 30 shown penetrating into the material as it is being laminated or fused together. Although only a single hot pin 30 is shown, a more typical embodiment would include a great plurality of hot pins in the hot pin perforator. It would not be unreasonable to use thirty-six to one hundred or more hot pins per square inch of material to accomplish a good lamination. However, for simplicity, only a single hot pin is shown in FIG. 2.

The materials to be fused together or bonded are served to the hot pin perforator by passing both the materials, that is the film and fabric, over the pressure control roller 32 in face-to-face contact with each other. The pressure control roller is a fiber brush having closely spaced bristles that serve to allow the hot pin 30 to pierce the materials and enter the brush without distortion of the hot pin. As the materials, that is the fabric 20 and the film 22, pass through the bite between the hot pin perforator 28 and the pressure control roller 32, the fabric 20 and film 22 will be bonded together at the juncture between the two plies in the area of the perforation provided by the hot pin 30. In the preferred embodiment shown in FIGS. 2 and 3, the fabric, which in a preferred embodiment, is a foam sheet that preferably but not exclusively has an absorption capability, is the ply closest to the hot pin perforator roller 28 and is the first ply pierced by the hot pins.

As the pin first contacts the fabric ply surface, the contact is at an angle from the perpendicular. As the laminate moves through the bite between the hot pin roller and the counter pressure roller, the hot pin will move from the initial contact position with the laminate through a position where the hot pin is perpendicular to the laminate to a final non-perpendicular position where the hot pin is rotated out of contact with the laminate. If there is a speed differential between the hot pin perforator roller and the pressure control roller, the shape of the hole pierced by the hot pin will be elongated in the direction of travel. If there is no speed differential, then the hole pierced by the hot pin could be generally circular depending on the depth of penetration of the hot pin.

In the preferred embodiment, the hot pin traveling through the fabric and the film ply assists in forming the bond between the two plys, that is the hot pin will first contact the fabric and cause some of the material to be displaced downwardly toward the film layer forcing the fabric ply into close mechanical contact with the film ply thus perfecting the bond between the various plies.

FIG. 3 shows a representation of the multi-ply foam and thermoplastic material after being laminated together. The foam ply 20 has been partially forced into the film ply 22 and the film ply 22 has been partially fused to the foam ply 20. Since the foam ply is not normally a fibrous material (but is referred to as a "fabric" herein), the structure between it and the plastic film ply 22 is an interlocking arrangement with the two plies not only fused together but also interlocked together as the melted film is pushed into the foam ply as the increasing diameter of the hot pin melts the film ply during pin penetration. The ring of melted film will flow into the foam ply and be bonded thereto.

Although the preferred embodiment supposes the use of a foam ply for the fabric, it is also contemplated that other fabrics that may have fibrous characteristics are alternatively used. The fibrous fabric could be a natural fiber product of plant or animal origin or a fibrous synthetic product.

One embodiment of a laminated product is shown in FIG. 6. In this figure the fabric ply 20 is centered on the film ply 22 which is considerably wider than the fabric ply 20 after the perforation operation. Neither the width of the film ply, the fabric ply or the lamination itself is a limiting feature as long as the multiple plies are bonded together using a hot pin perforator. The preferred multi-ply laminate shown here has the ply of fabric 20, in this case, a foam material with a plurality of apertures which are the perforations shown on 20, and the ply of film 22, preferably a thermoplastic material also having a plurality of apertures which are in register with the apertures of the fabric ply mechanically or, alternatively, depending on the properties of the plies being joined, chemically bonded together at the periphery of the apertures. The "mechanical bond" referred to is the result of the plastic flow of the thermoplastic material encapsulating, entrapping or surrounding the fibers of the fibrous fabric or filing or partially filing the pores of foam fabrics.

It is also contemplated that multi-ply laminates of more than two plies could be made utilizing the hot pin perforator. Laminates of three, four or more plies, depending on design requirements are also contemplated by the inventor.

In FIGS. 4 and 5, another embodiment of the invention is shown. In this case, the fabric 20 is pierced after the plastic ply 22 is pierced. In this embodiment, as the materials pass through the bite between the hot pin perforator 28 and the pressure control roller 32, the hot pins 30 will pierce the film 22 and as it pierces the film, the hot pin will melt the film in the local area of the hot pin. The melted film will be partially extruded and travel with the hot pin as the pin moves into the fabric layer 20. The melted film will flow between and into the fibers of the fabric and upon cooling, will have entrapped these fibers in and to the film 22 thereby bonding the fabric 20 to the film 22.

FIG. 5 shows the typical, however exaggerated, condition of the material after the film 22 and fabric 20 have been bonded together. The aperture 34 shows a uniform donut shaped annulus or inwardly directed protuberance with the major bulk of it projecting into the fabric 20 and an upset portion 36 on the exposed film side of the laminate. When the ply of thermo deformable film and the ply of fibrous material are passed through the hot pin perforator in a face-to-face relationship, the plurality of inwardly directed protuberances will be formed as the film is distorted. At this point the fabric ply will be bonded to the film ply as the fabric filaments and fibers are entrapped or stuck to the protuberances. It is contemplated that the fibrous material shown in FIGS. 4 and 5 could be open or closed cell foam sheet as well.

The product of the lamination process; whose process steps are: serving at least a first and a second ply of material to a hot pin perforator, at least one of said plies being a thermoplastic material, perforating the multi-ply material with a hot pin such that thermoplastic material is melted sufficiently to allow it to flow into engagement with a fabric ply of material which becomes bonded to the thermoplastic material through a mechanical or chemical bond, and removing the laminated material from contact with the hot pin perforator; will be a laminated material having a fluid impervious surface punctuated with annular tear resistant perforations backed by a fluid absorptive material. The multiplicity of perforations in the film surface allow and assist the passage of fluid through the film 22 and in forming a static bond of good laminate strength between the film ply and the fabric ply.

The invention has been described as the method of manufacturing a multi-ply laminate and the product of such manufacture in the best mode known to the applicant, however, it will be apparent that the invention may be varied in many ways. Such variations are not to be regarded as a departure from the spirit and scope of the appended claims.

What is claimed is:

1. The method of making a multi-ply laminated product using a hot pin perforator having a plurality of heated pins mounted on a roller and a pressure control roller, said hot pin perforator and said pressure control roller operating at different speeds and forming a bite through which said multi-ply laminated product passes comprising the steps of:

providing a ply of fabric material to said bite;

providing a ply of thermoplastic film material to said bite in face-to-face contact with said ply of fabric material;

passing said ply of fabric material and said ply of thermoplastic film material through said bite simultaneously;

perforating said ply of fabric material with said heated pins of said hot pin perforator, said heated pins first contacting the surface of said fabric ply at an angle from the perpendicular;

perforating said ply of thermoplastic film material with said heated pins of said hot pin perforator as said laminate is passed through said bite as said heated pins move from an initial contact position with said laminate through a position where said heated pins are perpendicular to said laminate until a final non-perpendicular position where said heated pins are rotated out of contact with said laminate such that perforations made by said heated pins in said fabric material and in said thermoplastic film material of said fabric ply and said thermoplastic film ply respectively are in register and said perforations are elongated in the direction of travel of the laminate through said bite.

2. The invention in accordance with claim 1 wherein said fabric is a foam material.

3. The invention in accordance with claim 1 wherein said fibrous material is a non-woven product comprised of non-directional fibers.

* * * * *